United States Patent [19]  
Brundage et al.

[11] 3,872,654  
[45] Mar. 25, 1975

[54] MOBILE LEAF SHREDDING AND BAGGING MACHINE

[75] Inventors: Richard B. Brundage; John A. Palmer; Donald L. Blachly, all of St. Louis, Mo.

[73] Assignee: Emerson Electric Co., St. Louis, Mo.

[22] Filed: Oct. 9, 1973

[21] Appl. No.: 404,149

[52] U.S. Cl. ............... 56/13.1, 56/13.3, 56/17.2, 56/202, 241/101.7
[51] Int. Cl. .............................................. A01d 43/00
[58] Field of Search ................... 56/12.8–13.4, 56/DIG. 8, 202, 17.2, 16.9, 501; 241/101.7, 84, 88.1

[56] References Cited
UNITED STATES PATENTS

| | | | |
|---|---|---|---|
| 2,538,643 | 1/1951 | Gregory | 56/12.8 |
| 3,165,877 | 1/1965 | Leader et al. | 56/202 |
| 3,430,421 | 3/1969 | Matthews | 56/202 X |
| 3,531,923 | 10/1970 | Delay | 56/16.9 |
| 3,568,421 | 3/1971 | Smith et al. | 56/202 X |
| 3,688,479 | 9/1972 | Martinson et al. | 56/13.2 |
| 3,790,094 | 2/1974 | Spice | 56/13.3 X |

FOREIGN PATENTS OR APPLICATIONS

| | | | |
|---|---|---|---|
| 206,240 | 2/1957 | Australia | 56/17.2 |

Primary Examiner—Louis G. Mancene  
Assistant Examiner—J. N. Eskovitz  
Attorney, Agent, or Firm—Charles E. Markham

[57] ABSTRACT

A wheeled machine having a vertical axis volute chamber spaced from the ground; a forward pick-up snout is connected to a central inlet to the chamber; a vertical axis fan in the chamber is driven by an overhead-mounted vertical shaft engine; straight axially extending end surfaces of the fan blades closely sweep an arcuate grill spanning the outlet of the chamber; the grill comprises a series of vertically spaced horizontal bars and slots with the slots terminating in knife edges; and a collector bag having a zipper-closed lower end is hung from its upper end in a vertical position and has an arm thereof connecting the outlet of the chamber with the upper end of the bag.

12 Claims, 11 Drawing Figures

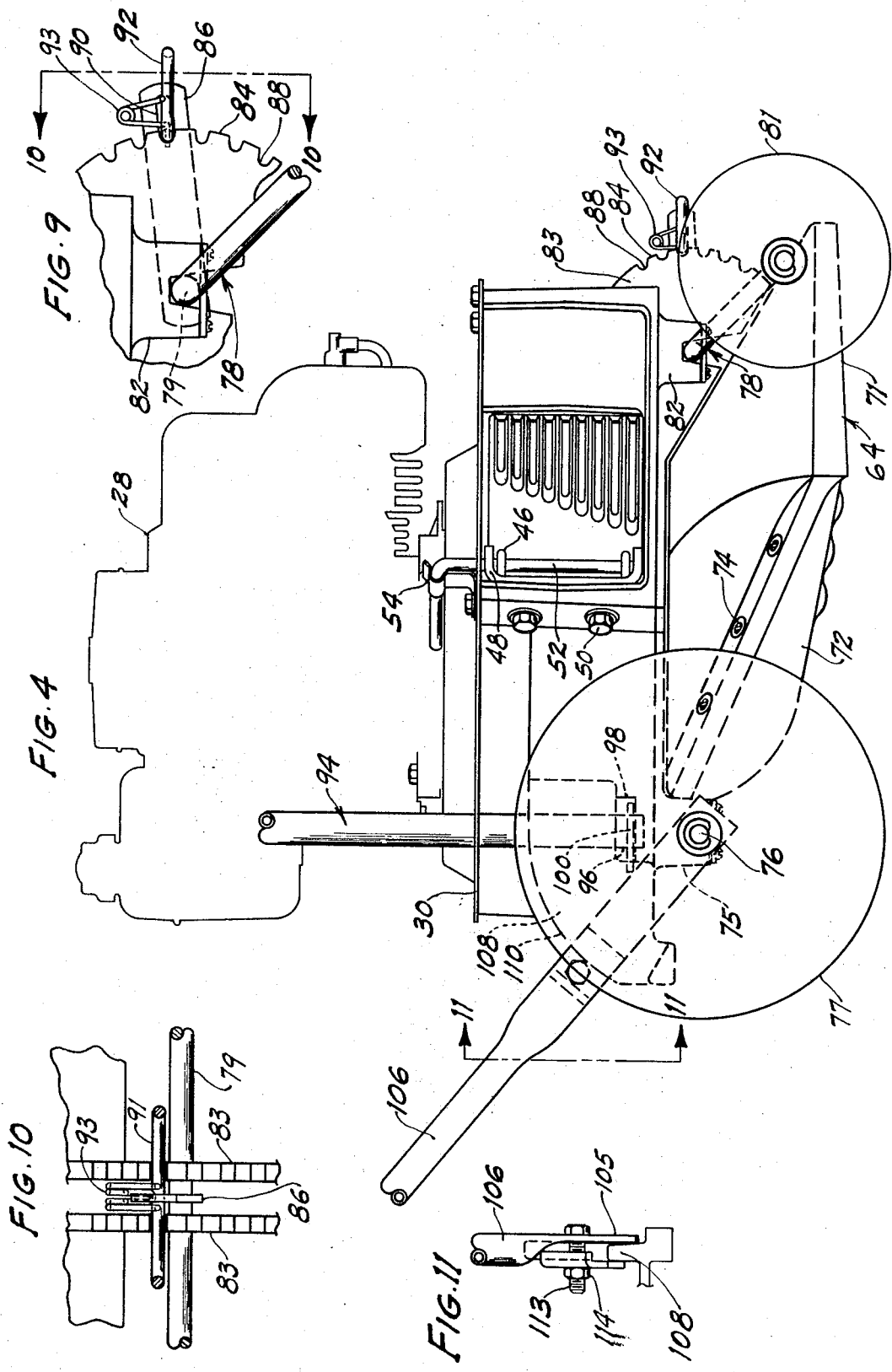

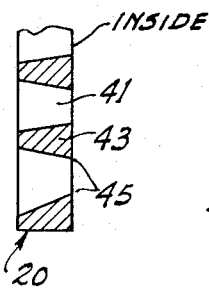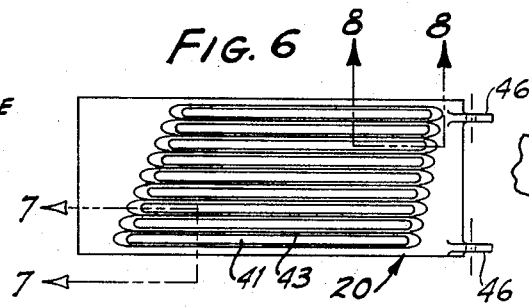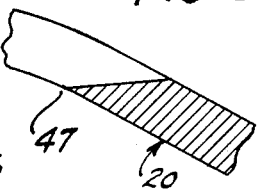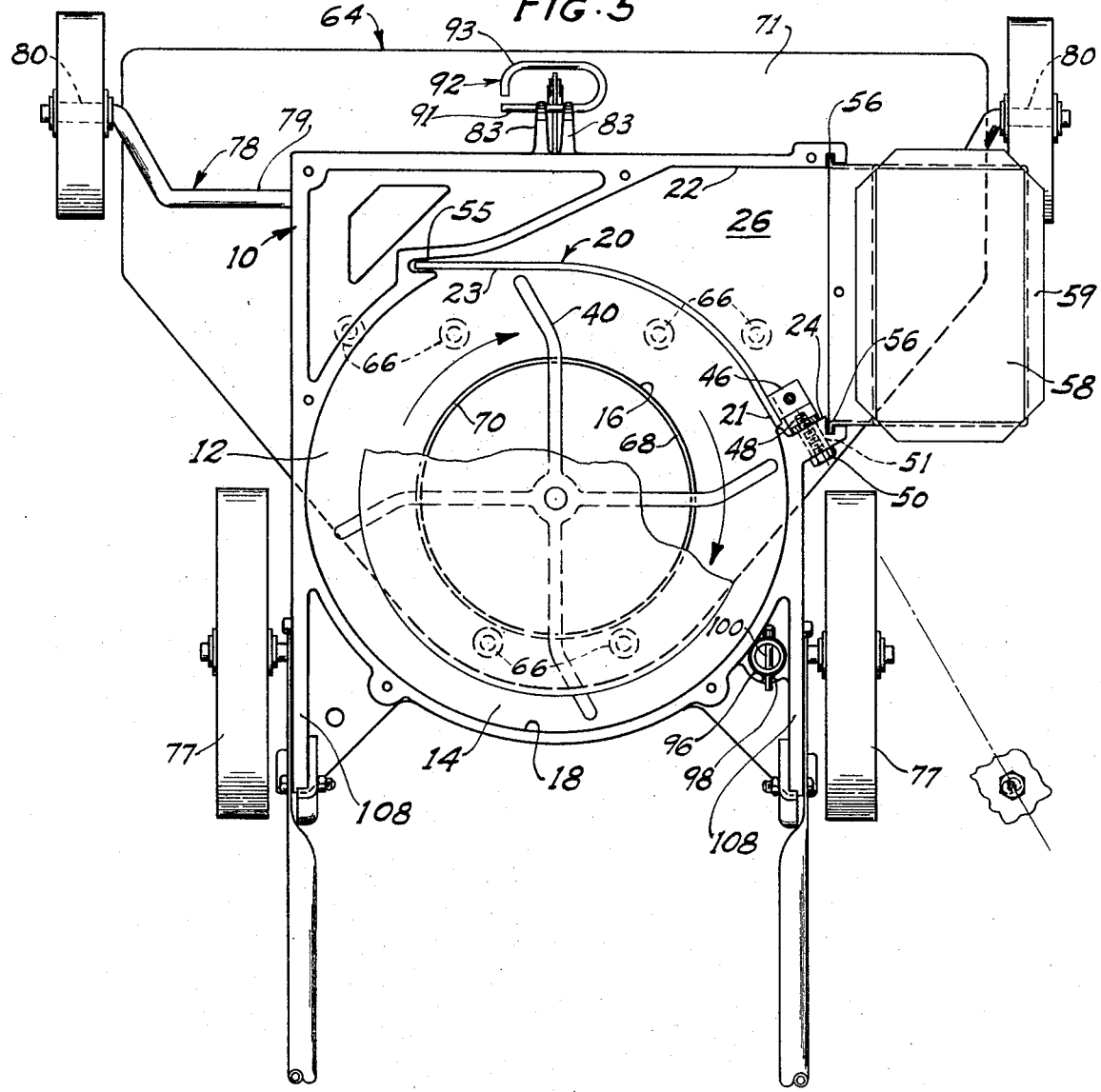

MOBILE LEAF SHREDDING AND BAGGING MACHINE

This invention relates generally to leaf shredding machines, and particularly to a mobile machine which picks up scattered leaves as it is moved along and bags them after shredding.

A problem encountered in the operation of leaf shredding machines is frequent clogging when wet leaves or stringy material is fed into the machine.

Another problem is bagging and disposing of the shredded leaves. In many areas leaf burning is prohibited by law, and the quantities to be disposed of are often such as to require a considerable number of bags. Readily available, disposable, plastic film garbage bags are quite suitable, and are currently widely used for this purpose because of their low cost. It is, however, quite difficult to fill a bag by placing the open end over the discharge outlet of a leaf shredding machine which relies upon a high rate of air flow to pick up leaves and discharge them after shredding. Unless the bag is specially constructed to permit venting, the back pressure, which would otherwise occur, precludes the practical use of low cost, disposable, plastic film or paper bags.

It is an object of this invention to provide a generally new and improved mobile leaf shredding and bagging machine in which clogging is substantially reduced by an arrangement in which the ends of the blades of a fan closely sweep the elongated slots in a novel arcuate breaker grill which is conveniently accessible and removable to permit quickly and conveniently clearing the machine in event it does become clogged.

A further object is to provide a machine as in the foregoing paragraph in which the arcuate breaker grill has a series of vertically spaced horizontal slots which terminate in knife edges, whereby material accumulating at one end of the slots is cut.

A futher object is to provide a mobile leaf shredding and bagging machine in which scattered leaves are picked up from the ground as it moves along and discharged into a collector bag after shredding by air flow generated by an engine-driven fan, and includes a novel collector bag which is conveniently emptied without removal and from which low cost, disposable bags may be conveniently filled by gravity.

A further object is to provide a mobile, wheeled, leaf shredding machine having a forward pick-up snout, with means operated by a single conveniently positioned handle for adjustably positioning the pick-up snout relative to the ground.

Further objects and advantages will appear from the following description when read in connection with the accompanying drawings.

In the drawings:

FIG. 4 is an enlarged side elevational view with the bag attaching elbow removed from the discharge outlet;

FIG. 5 is an enlarged top plan view with the engine mounting plate removed, showing the interior of the chamber and the arcuate breaker grill;

FIG. 6 is an outside elevational view of the breaker grill orthographically projected from the plan view thereof shown in FIG. 5;

FIG. 7 is a fragmentary cross-sectional view showing the cross-sectional configuration of the horizontal grill bars and is taken along line 7—7 of FIG. 6;

FIG. 8 is a fragmentary cross-sectional view taken along line 8—8 of FIG. 6, showing the knife edges formed at the ends of the horizontal grill slots;

FIG. 9 is an enlarged detailed side view showing the arrangement for adjusting the spacing of the pick-up snout from the ground;

FIG. 10 is a front view of the adjusting means shown in FIG. 9, taken along line 10—10 of FIG. 9; and FIG. 11 is a fragmentary view taken along line 11—11 of FIG. 1, showing an arrangement for clamping the pusher bar in an adjusted position.

Figure 1:
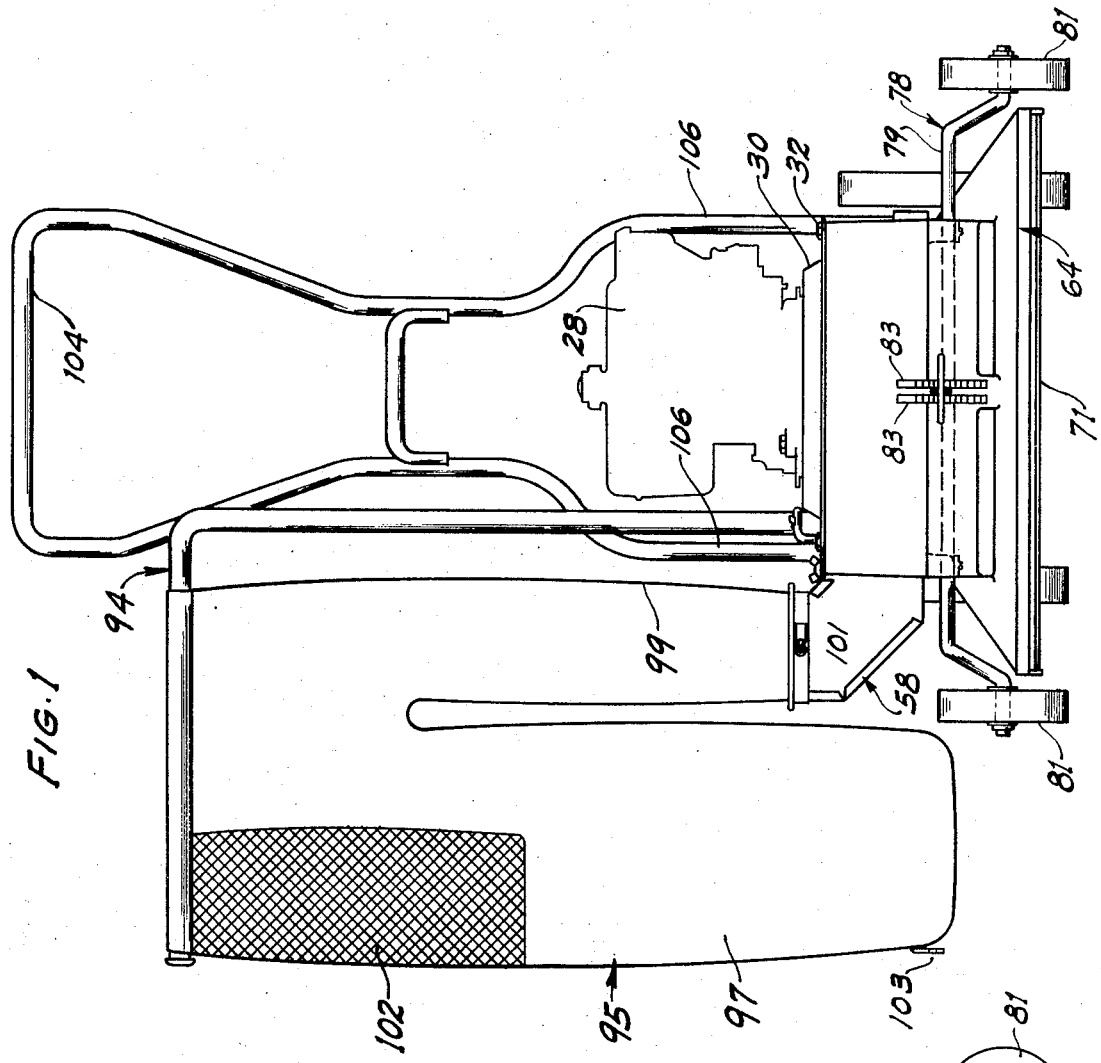
FIG. 1 is a front elevational view of a mobile leaf shredding and bagging machine constructed in accordance with the present invention.

Referring to the drawings in more detail, the machine comprises a main body casting 10 having an upwardly open chamber 12 formed therein, see FIG. 5. The chamber 12 has a floor 14 with a central circular inlet 16 therein. The sidewall 18 of chamber 12 is spiral with respect to the center of circular inlet 16, which sidewall is interrupted to form an outlet opening spanned by a breaker grill generally indicated at 20. Sidewall portions 22 and 24 extending beyond the outlet opening form an outlet passage 26.

A conventional air-cooled gasoline engine of the type employed in rotary grass mowers is shown in outline at 28 and is mounted on an engine mounting plate 30. Plate 30 is, in turn, attached to the upper surface of main body casting 10 by screws 32 and forms a top closure wall of chamber 12 and outlet passage 26. The engine 28 has a vertical drive shaft 34 coaxial with the center of chamber inlet opening 16. A fan, generally indicated at 36, has a central hub 38 receiving the engine drive shaft 34 and is keyed thereto. The fan is rotated in a clockwise direction, as indicated by arrows in FIG. 5. The fan 36 has four relatively rigid radial blades 40, the outer ends 42 of which are straight, and parallel with the hub axis, and extend substantially the depth of chamber 12. Fan 36 is further provided with an upper, integral, circular baffle plate 44.

The breaker grill 20 has a short straight portion 21 at the one end and is provided with, at this end, lugs 46 having perforations therein which align with the perforations in the parallel legs of a U-shaped bracket 48. The bracket 48 is fastened to the main body casting by screws 50. A removable pin 52 passing through the perforations in lugs 46 and the legs of bracket 48 attach this end of the grill 20 to the main body casting. The upper end portion of removable pin 52 is bent over at ninety degrees and is detachably secured in position by a spring clip 54, see FIG. 4. The grill 20 has a longer straight portion 23 at its other end and is freely received at this end in a recess 55 formed in the body casting, see FIG. 5.

Figure 3:
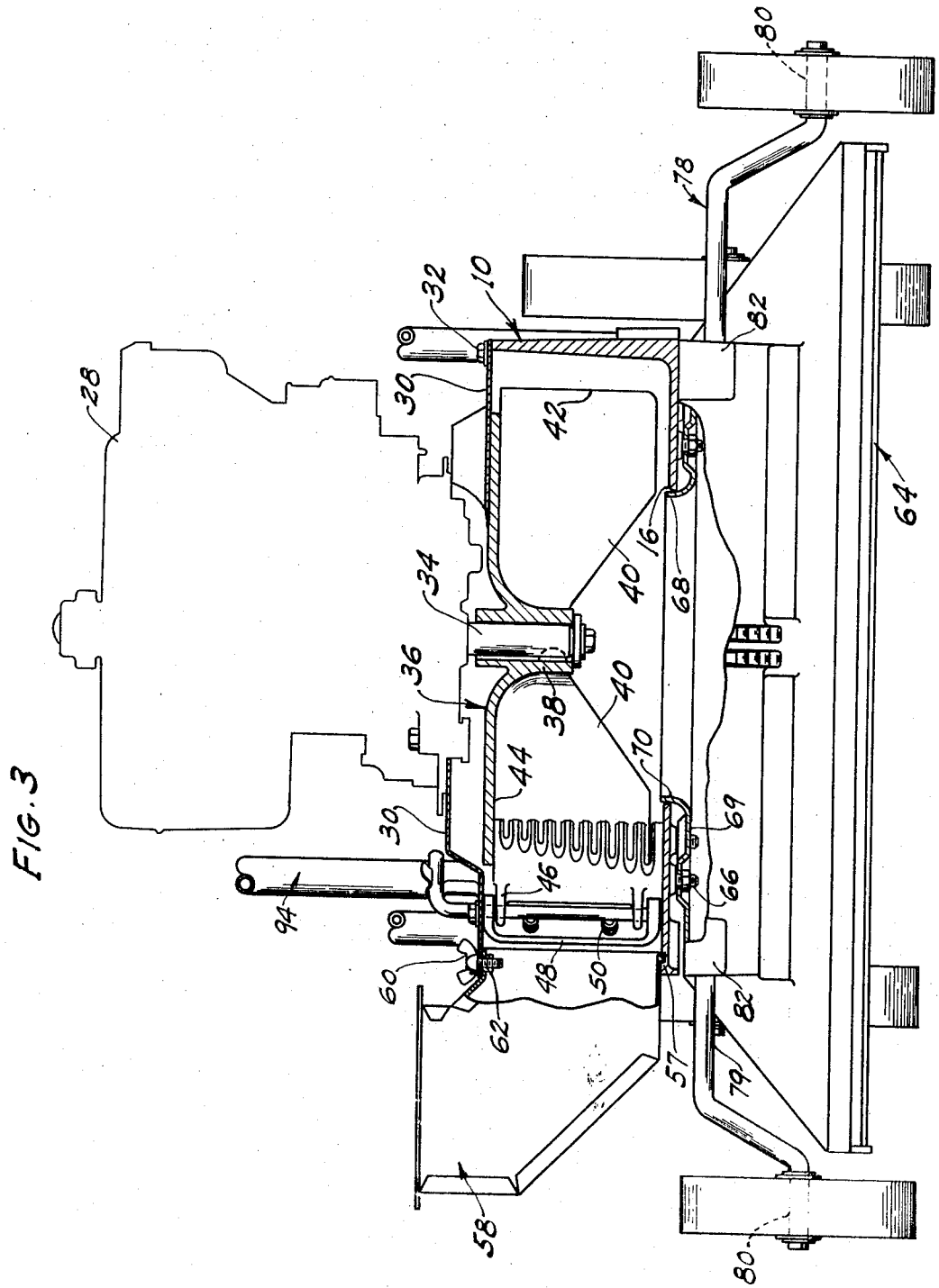
FIG. 3 is an enlarged front elevational view with parts broken away and with other parts shown in cross-section.

A sheet metal elbow 58 having a horizontal inlet connected to the outlet passage 26 and a vertical outlet directs the discharge from the machine vertically upward. The sidewalls 22 and 24 and the floor 14 of the outlet passage 26 have vertical slots 56 and a horizontal slot 57 therein, respectively. These slots slidably receive right angularly formed edges of the side and bottom walls of the sheet metal elbow 58, see FIGS. 3 and 5. A winged screw 60 passing through a hole in the engine mounting plate 30 and engaging a nut 62 fixed on the underside of the upper wall of elbow 58 detachably connects the elbow to outlet passage 26. It will be seen from FIG. 5 that the shape and arrangement of grill 20 with respect to outlet 26 is such that the grill may be conveniently removed by sliding it through the outlet 26 after the detachable elbow 58 and the grill attaching pin 52 are removed.

The intermediate portion of the length of grill 20 is arcuate and substantially concentric with the arc described by the ends of fan blades 40 and is closely swept by the vertically straight ends of the fan blades. The grill 20 is relatively rigid, being constructed from a steel plate in the order of three-sixteenths of an inch thick. Referring to FIGS. 6 and 7, the grill has horizontal slots 41 defined by horizontal bars 43. In cross-sectional configuration, as shown in FIG. 7, the horizontal sides of bars 43 converge outwardly with respect to chamber 12, whereby the sides of the slots 41 diverge outwardly. This arrangement provides an acute angle 45 against which leaves and other matter are forced by the fan blades and further insures that any matter passing the narrower entry of the slot at the inner face of the grill will freely pass on through the slot.

Referring to FIG. 8, sharp knife edges 47 are formed at the inner face of the grill at the ends of slots 41. Thus, very wet leaves or tough stringy twigs which do not break and pass through the grill will have those portions thereof extending into the grill slots sliced off as they are forced by the fan blades against knife edges 47. Such matter may be circulated and cut several times before completely passing through the grill. It will be noted that the grill slots 41 terminate in knife edges at both ends of the grill, whereas only the knife edges at one end would be effective. This occurs incidentally in the construction of the grill. The slots 41 are cut in a flat steel plate by formed milling cutters which enter the plate and exit therefrom in a similar manner. After the slots are cut, the flat steel plate is formed to provide the intermediate arcuate portion.

Means to nicely adjust the spacing of the arcuate portion of grill 20 with respect to the ends of fan blades 40 is accomplished by providing horizontally elongated clearance holes 51 in the body casting to receive the headed screws 50. By loosening the screws 50, the U-shaped bracket 48, into which screws 50 are threadedly engaged, may be shifted to slightly swing the attached end of the grill toward or away from the fan blade ends.

A pick-up snout, generally indicated at 64, is formed as a casting having a top wall and sidewalls and open at the bottom. A horizontal top wall portion 69 of the snout casting underlies the floor 14 of the main body casting and is attached thereto by threaded studs and nuts 66. This horizontal top wall portion 69 has a circular opening 68 therein with a surrounding flange 70, which flange is entered into the circular inlet 16 in the floor 14 of chamber 12, see FIG. 3. The top and sidewalls of the snout casting extend downward and forward from the horizontal top wall to a wide rectangular portion 71 close to the ground. A bottom pan 72 attached to the sidewalls of the snout casting by screws 74 closes the underside of the snout casting, except for the forward rectangular portion 71 through which leaves enter.

A straight rear axle 76 is supported in downwardly directed integral bosses 75 at the sides of the main body casting near the rear thereof. Axle 76 carries a pair of rear wheels 77 suitably mounted for rotation thereon.

A front axle 78 has an intermediate straight portion and offset end portions 80, and its intermediate straight portion 79 is supported for rotation in downwardly directed integral bosses 82 at the sides of main body casting 10 near the front thereof. A pair of front wheels 81 are suitably mounted for rotation on the offset end portions 80 of front axle 78.

A pair of integrally cast bosses 83 positioned centrally on the lower front side of main body casting 10 project forwardly in parallel and relatively closely spaced relationship. These bosses have arcuate surfaces 84 centered on the axis of the intermediate straight portion 79 of front axle 78. A lever 86 rigidly connected at one end to the axle portion 79, as by welding, extends radially forward therefrom between bosses 83 and beyond the arcuate surfaces 84 thereof.

The arcuate surfaces 84 are provided with notches 88, and the lever 86 has a radially elongated slot 90 therein near the free end thereof which slidably receives the straight portion 91 of a release handle 92 comprising a rod or pin formed in a loop. A coiled spring 93 biases the straight portion 91 of handle 92 toward the arcuate surfaces, and when the handle registers with a notch 88, it is pushed into the notch by spring 93, thereby locking the lever 86 and the attached axle 78 against rotation.

The outwardly formed loop portion 93 of handle 92 extends beyond the end of lever 86 comprising a rod or pin formed in a loop and provides a convenient handgrip and retains the portion in slot 90. It will be seen that rotation of the intermediate straight portion 79 of front axle 78 will raise or lower the front wheels with respect to the snout portion 71 and, therefore, lower or raise the snout portion 71 with respect to the ground.

A bag mounting standard 94, comprising a lightweight tube, has an upper horizontal portion supporting the upper closed end of an elongated collector bag 95 and a vertical portion extending downwardly through a perforation in the engine mounting plate 30 and into a socket 96 formed in the main body casting at its floor level. The vertical spacing of the mounting plate 30 and socket 96 is sufficient to support the standard 94 in vertical position.

Figure 2:
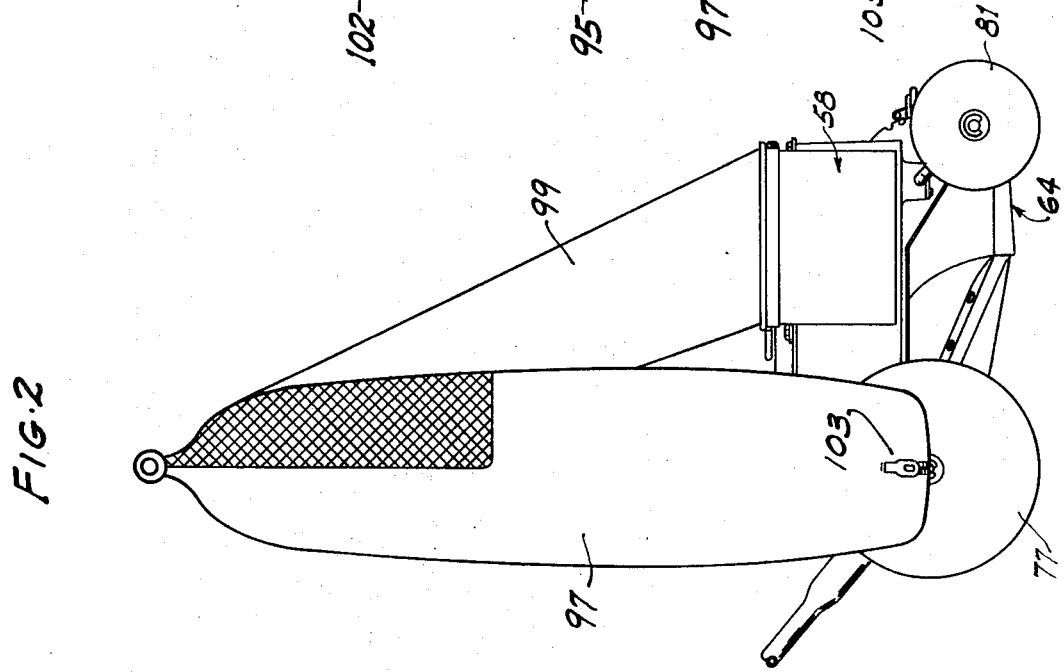
FIG. 2 is a side elevational view of the machine shown in FIG. 1.

The socket 96, see FIGS. 4 and 5, has notches 98 in the vertical wall thereof, and the standard 94 has a transverse pin 100 therein, spaced from the lower end thereof, which enters the notches 98 to prevent rotation of the standard and to hold it in the position shown in FIGS. 1 and 2. The standard may, however, be rotated so as to swing the bag inwardly toward the machine, while still remaining in socket 96, by lifting it slightly so that pin 100 rests on some other part of the top wall of the socket spaced from the notches.

The bag 95 has an upper closed end with a horizontal sleeve stitched therein, which receives the horizontal portion of the standard 94 so that the bag hangs in a vertical position. The lower end of the main bag portion 97 is spaced from the ground and has an opening closed by a zipper 103. The bag 95 is further provided with a loading arm portion or sleeve 99 which is connected to and in communication with the upper end of the main bag portion 97 and extends downwardly and forwardly therefrom to a lower open end which is fitted over and attached to the vertical outlet of sheet metal elbow 58, as by a drawstring 101. The bag 95 may be of any suitable material. We prefer to construct the bag of a tough, non-porous material and provide open mesh portions 102 in the upper portion thereof through which to vent discharge air.

A conventional push handle 104, formed of tubing, has lower end portions 105 of its spaced parallel legs 106 flattened and perforated to receive the rear axle 76. Integrally formed vertical ribs 108 on the rear of the main body casting have arcuate surfaces 110 centered on the rear axle axis. A clamp 112 secured to each of the flattened end portions of legs 106 by a bolt 113 and nut 114 clamps the push handle in a selected angular position. If preferred, the clamp 112 may be dispensed with and, in lieu thereof, spaced notches may be formed in the arcuate surfaces 110. In this arrangement, the bolts 113 would be selectively entered into the notches, and the flattened end portions of legs 106 would be clamped against the ribs 108 by the nuts 114.

In operation, as the machine is moved along, leaves and other debris are drawn into the chamber 12 through the pick-up snout by the considerable suction developed at the chamber inlet 16 by the engine-driven fan. After shredding by passage through the grill 20, the material is blown outward and upward through the loading arm portion 99 of the collector bag to the top of the main bag portion 97 from whence it falls to the bottom thereof. The air blast is substantially exhausted through the mesh portion 102, so that the main bag portion fills from the bottom up essentially by gravity.

Low cost, disposable plastic film or paper bags may be conveniently filled from the collector bag by simply slipping the open end of such disposable bag over the lower end of the main collector bag portion and opening the zipper 103. The lower end of the main portion 97 of the collector bag is spaced from the ground and is, of course, sufficiently flexible to permit the tilting or lifting of portions thereof necessary to accomplish filling of the disposable bag.

The foregoing description is intended to be illustrative and not limiting, the scope of the invention being set forth in the appended claims.

We claim:

1. In a leaf shredding machine, casing means forming a chamber having horizontal top and bottom walls and a curved vertical sidewall, a central inlet opening in said bottom wall for receiving leaves, and an outlet opening in said curved sidewall for discharging shredded leaves, a vertical shaft fan centrally journalled in said top wall, said fan having a pluralilty of blades with vertically extending outer edges in spaced relationship with said curved sidewall, a breaker grilll spanning said outlet opening and being detachably connected to the sidewall of said chamber, said grill including an arcuate portion having its center of curvature substantially on the fan axis and being arranged to be closely swept by the outer edges of said fan blades, and said grill comprising a curved plate having a series of elongated vertically spaced bars and intervening slots extending horizontally across said outlet opening.

2. The construction and arrangement claimed in claim 1 wherein the adjacent sides of said horizontal grill bars diverge outwardly with respect to said chamber and form acute angles with the inner face of said grill, whereby the width of said slots is greater at the outer face than at the inner face of said grill.

3. The construction and arrangement claimed in claim 1 wherein said horizontal slots in said grill terminate in sharp knife edges at least at one end.

4. The construction and arrangement claimed in claim 1 having means accessible exteriorly of said chamber for detachably connecting the ends of said breaker grill to said chamber sidewall at opposite sides of said outlet opening, and in which said grill is removable exteriorly of said chamber from its opeprative assembled position in said outlet opening.

5. The construction and arrngement claimed in claim 4 in which said curved chamber sidewall has a volute form and which includes means forming an outlet passageway leading from said outlet opening and extending generally tangentially from said volute sidewall, and said grill being of such size and shape as to permit its passing through said outlet passageway when removing it from entering it into its detachably assembled position in said outlet opening.

6. The construction and arrangement claimed in claim 4 wherein said means detachably connecting one end of said breaker grill to said sidewall at one side of said outlet opening is adjustable to permit movement of said one end toward or away from the arc described by said fan blades and said means detachably connecting the other end of said grill being such as to permit such movement of said one end of said grill.

7. In a leaf shredding and bagging machine, casing means forming a shredding chamber having a central inlet, a peripheral outlet and upwardly directed outlet passage means, motor-driven fan means in said chamber operative to discharge shredded leaves and the like through said outlet passage means at considerably velocity, an elongated vertically arranged bag for accumulating the shredded discharge from said outlet, said bag having an upper closed end and an open lower end with means for selectively closing it, bag support means carried by said casing and suspending said bag from its closed upper end, and said elongated vertically arranged bag hanging freely from its upper closed end with a substantial portion of the length of said bag above the upper end of said outlet passage means, conduit means connecting said outlet passage means with the upper closed end of said bag comprising a sleeve portion of said bag extending freely from the upper closed end of said outlet passage means, and said bag further including an open mesh portion at its upper end for exhausting air whereby the bag is filled essentially by gravity and will empty by gravity when said lower end is open.

8. The construction and arrangement claimed in claim 7 having bag support means comprising a length of tubing with a vertical portion extending upward from said casing means and a bag supporting portion extending horizontallly from the upper end of said vertical portion, means including a socket in said casing means slidably receiving the lower end of said vertical tubing portion for convenient detachable connection thereto, and a transverse pin near the lower end of said vertical tubing portion cooperating with vertical slots in the wall of said socket for the selective angular positioning of said bag support means.

9. In a machine having an upwardly directed outlet through which cut or shredded material is discharged by air flow, an elongated vertically arranged collector bag having a closed upper end and an open lower end and hanging freely suspended from its upper closed end, support means carried by said machine supporting the closed upper end of said bag above said outlet, said bag including a sleeve portion connected at one end to and in communication with the upper end of said bag and extending downwardly free of said bag and connected at its other end to said outlet, said bag further including an open mesh portion at its upper end to permit the discharge of air and said lower open end of said bag being provided with means for selectively closing it.

10. The construction and arrangement claimed in claim 9 in which one end of said sleeve portion is formed integral with an upper end portion of said collector and bag and extends freely therefrom to its connection with said outlet.

11. In a wheeled lawn care machine, a body member, an axle having an intermediate straight portion journalled in said body member and axially offset end portions extending from opposite sides of said body, a pair of wheels mounted for rotation on said offset end portions, means for adjustably positioning said wheels with respect to said body to vary the spacing of said body from a surface on which the machine is wheeled and for latching the wheels in an adjusted position, comprising; an arcuate surface on said body having its center of curvature substantially on the axis of said intermediate axle portion and said surface having a series of notches therein, a lever fixed at one end to said intermediate axle portion and having a free end portion extending radially across said arcuate surface, a handle slidably mounted on said free end portion of said lever for radial movement toward and away from said arcuate surface, spring means biasing said handle toward said arcuate surface and said handle having a portion thereof adapted to selectively enter one of said notches when moved toward said arcuate surface.

12. In a wheeled lawn care machine for picking up leaves and the like, a body member having rear wheels, a pair of front wheels, and a forward pick-up snout, a front axle having an intermediate straight portion journalled in a forward portion of said body and axially offset end portions extending from opposite sides of said body on which end portions said front wheels are mounted for rotation, means for adjustably positioning said front wheels so as to very the spacing of said pick-up snout from the surface on which the machine is wheeled and for latching said wheels in an adjusted position, comprising; a forwardly facing arcuate surface on the front of said body having its center of curvature substantially on the axis of said intermediate axle portion and said arcuate surface having a series of notches therein, a lever having one end fixed to said intermediate axle portion and having a free end portion extending radially across said arcuate surface, said lever having a radially extending slot in said free end portion thereof, a handle slidably mounted in said slot and movable radially toward and away from said arcuate surface, said handle having a portion thereof adapted to engage one of said notches in said surface when said handle is moved toward said surface, and spring means biasing said handle toward said arcuate surface.

* * * * *